US005193409A

United States Patent [19]
Babinski

[11] Patent Number: 5,193,409
[45] Date of Patent: Mar. 16, 1993

[54] MULTIPLE CIRCUIT INTERNAL BALL NUT RETURN ASSEMBLY WITH RADIAL DROP-IN INSERT FOR BALL SCREW DEVICES

[75] Inventor: James A. Babinski, Saginaw, Mich.

[73] Assignee: Thomson Saginaw Ball Screw Company, Inc., Saginaw, Mich.

[21] Appl. No.: 861,092

[22] Filed: Mar. 31, 1992

[51] Int. Cl.⁵ ............................................. F16H 27/02
[52] U.S. Cl. ............................... 74/89.15; 74/424.8 R; 74/459
[58] Field of Search ................ 74/89.15, 424.8 R, 459

[56] References Cited

U.S. PATENT DOCUMENTS

| | | | |
|---|---|---|---|
| 2,267,524 | 12/1941 | Hawkins | 74/499 |
| 2,455,368 | 12/1948 | Hoffar | 74/459 |
| 2,502,066 | 3/1950 | Tanner | 74/459 |
| 3,124,969 | 3/1964 | Grabowski et al. | 74/459 X |
| 3,170,336 | 2/1965 | Bohnhoff | 74/424.8 |
| 3,369,423 | 2/1968 | Sears | 74/424.8 |
| 3,479,897 | 11/1969 | Holthofer | 74/441 |
| 3,636,780 | 1/1972 | Wallace | 74/89.15 |
| 3,791,232 | 2/1974 | Helmer | 74/459 |
| 3,851,541 | 12/1974 | Ploss et al. | 74/459 |
| 3,902,377 | 9/1975 | Lemor | 74/459 |
| 4,074,585 | 2/1978 | Richaud et al. | 74/424.8 R |
| 4,211,125 | 7/1980 | Benton | 74/424.8 R |
| 4,604,911 | 8/1986 | Teramachi | 74/89.15 X |
| 4,643,041 | 2/1987 | Benton | 74/424.8 R X |
| 4,677,869 | 7/1987 | Mayfield | 74/459 X |
| 4,795,172 | 1/1989 | Brande | 74/424.8 R X |
| 4,905,534 | 3/1990 | Andonegui | 74/424.8 R X |
| 4,939,946 | 7/1990 | Teramachi | 74/89.15 |
| 5,005,436 | 4/1991 | Brusasco | 74/424.8 R |

FOREIGN PATENT DOCUMENTS

| | | |
|---|---|---|
| 693160 | 8/1964 | Canada . |
| 3924917 | 4/1990 | Fed. Rep. of Germany ..... 74/89.15 |
| 1-15567 | 1/1989 | Japan ................... 74/89.15 |
| 1-206153 | 8/1989 | Japan ................... 74/89.15 |
| 236171 | 1/1969 | U.S.S.R. .......................... 74/424.8 R |
| 1323802 | 4/1986 | U.S.S.R. . |
| 1406974 | 9/1975 | United Kingdom . |

Primary Examiner—Rodney H. Bonck
Assistant Examiner—Ryan W. Massey
Attorney, Agent, or Firm—Learman & McCulloch

[57] ABSTRACT

A multiple circuit, ball nut and screw assembly has a helically externally grooved screw providing a screw ball race and a nut having a complemental internal helical groove providing a nut ball race. The nut has a first internal axial ball return passage leading endwisely outwardly from a location interjacent the ends of the nut ball race and a second internal axial ball return passage leading endwisely outwardly in the opposite direction from this location. Return members at the outer ends of the ball return passage are configured for moving balls to and from the ball races from and to the first and second ball return passages. The nut has a radially extending slot at said location leading from the exterior circumferential surface of the nut through to the nut ball race and a drop-in insert, having a pair of adjacent end return elements is received in the slot. Each element has a circumferentially extending tongue extending inwardly into the screw ball race and an adjacent generally radially angularly directed channel leading to one of the ball return passages, the tongues extending to deflect the balls from the screw ball race into the adjacent channels or to guide them back to the races from the adjacent channels, dependent on the relative direction of travel of the nut and screw.

11 Claims, 3 Drawing Sheets

MULTIPLE CIRCUIT INTERNAL BALL NUT RETURN ASSEMBLY WITH RADIAL DROP-IN INSERT FOR BALL SCREW DEVICES

BACKGROUND OF THE INVENTION

This invention relates to multiple circuit ball nut and screw assemblies of the character which are employed when the ball nut has some length and it is desired to reduce ball friction and add load capacity to the ball screw system. While the use of multiple ball train circuits to reduce excessive ball friction and provide better system efficiency is well known, as exemplified, for example, by U.S. Pat. No. 2,267,524 to Hawkins, which I incorporate herein by reference, such systems have to my knowledge incorporated external ball return tubes of the type disclosed in the Hawkins patent. The ends of such transfer tubes have extended tangentially into the helical passages to capture the balls which encountered a sudden change in direction as they exited the raceway on a radial rather than helical path. Other ball return systems have utilized ball return end caps for nuts which have internal bores. These caps provided end returns for bearing balls which exited the raceways at one end of the ball nut and were translated through such bores parallel to the axes of the nuts and the centerlines of the helical raceway to the opposite end of the ball nut for recirculation back into the raceway. While, typically, these end return mechanisms have required 180° or more of travel with respect to the ball nut, for the balls to fully exit the raceway and enter the return path to recirculation, others have not. U.S. Pat. No. 3,170,336, which I also incorporate herein by reference, provides end caps with grooves which discharge the balls on essentially the helical path they had been following, before returning them to the opposite end of the ball nut. The following list of patents, which I further incorporate herein by reference, is typical of the prior art of which I am aware:

| | | |
|---|---|---|
| | 2,502,066 | Tanner |
| | 3,369,422 | Sears |
| | 3,479,897 | Holthofer |
| | 3,636,780 | Wallace |
| | 3,791,232 | Helmer |
| | 3,851,541 | Ploss et al |
| | 3,902,377 | Lemor |
| | 4,074,585 | Richaud et al |
| | 4,211,125 | Benton |
| | 4,939,946 | Teramachi |
| Canada | 693,160 | |
| USSR | 1,323,802 | |
| U.K. | 1,406,974 | |

SUMMARY OF THE INVENTION

The present invention is concerned with a multiple circuit ball nut, incorporated with a ball screw, in which multiple trains of balls are employed and the ball return passages are internal in the sense that they are bored in the nut and proceed in an endwise direction to transfer the balls from one end of each circuit to the other. A radial drop-in insert is utilized to create the multiple trains and, dependent on the direction of nut travel, remove the balls from their helical raceways along the same helical path they have been traveling, before returning them. With the system to be described, only a relatively short helical rotation, for example, 35° of rotation, is required for the balls to exit the raceways. The insert can comprise a one piece device which is capable of functioning as a dual end return system for a pair of adjacent ball circuits or trains.

One of the prime objects of the present invention is to provide a multiple circuit ball nut and screw assembly with a radial drop-in insert which has so short a required rotative exit path as to permit the ball return to be accomplished by a drop-in insert.

Another object of the invention is to provide an assembly of the character described wherein the balls in their short path of exit rotation have a minimum deviation from the helical path of travel in which they have been traveling.

Still another object of the invention is to provide a ball screw and nut assembly of the character described which can be preloaded utilizing conventional so-called skip or "Z type" preloading.

Still another object of the invention is to provide a reliable and readily manufactured system employing internal ball return paths and multiple circuits for separate multiple ball trains.

A further object of the invention is to provide a ball nut and screw assembly of the type described having higher load-carrying capacities and higher system efficiencies.

Another object of the invention is to provide a ball nut and screw assembly which can utilize a low cost, injection molded ball recirculating insert which is so configured as to guarantee that the balls are completely clear of the load-unload transition point, and in the unloaded state, before making a direction change, and thus can minimize noise and wear, and enhance the smoothness of running.

Still another object of the invention is to provide an assembly wherein the ball return insert provides high speed ball recirculation by guiding the balls away from the inner race outwardly to the outer diameter of the outer race on the helical angle of the ball race path, until such time as the balls are clear of the ball races before redirecting the balls to travel back in the axial direction.

Still a further object of the invention is to provide a ball screw and nut system of the type described wherein the ball return insert includes ball pickup threads which, if the balls are lost to the system, can function as load bearing members to prevent the free fall separation of parts supported by the assembly.

Another object of the invention is to provide a releasable radial drop-in insert which can be removed readily to allow servicing of the device, without removing the ball nut from the screw, and likewise the ball screw from the machine in which it operates.

Other objects and advantages of the invention will become apparent with reference to the accompanying drawings and the accompanying descriptive matter.

IN THE DRAWINGS

FIG. 6 is an end elevational view thereof;

Figure 1:
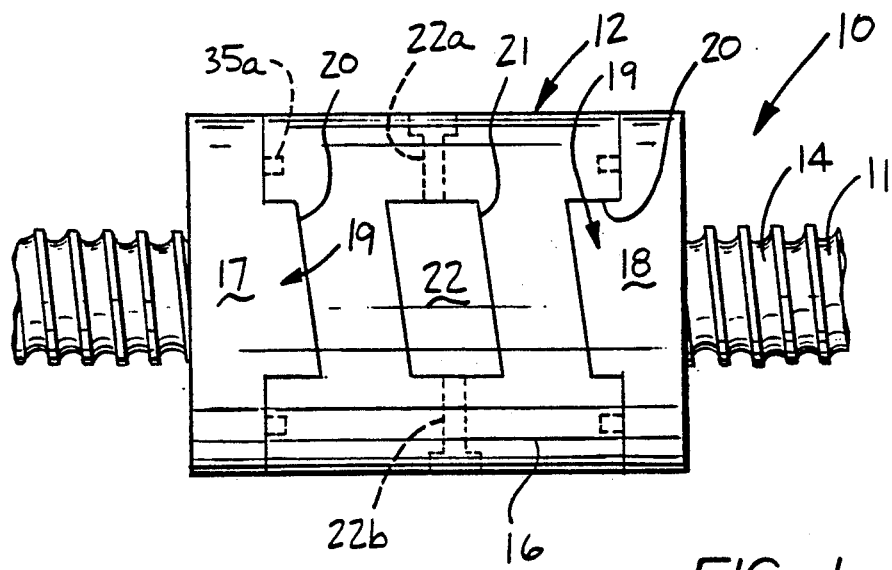
FIG. 1 is a top plan view of a typical system employing end cap ball returns and a radial drop-in insert which functions as an end return and ball guide system for a pair of independent adjacent ball trains traveling in a pair of adjacent ball circuits.

Referring now more particularly to the accompanying drawings and in the first instance to FIG. 1, a ball nut and screw assembly, generally designated 10, is illustrated as comprising a lead screw 11 over which a cylindrically shaped, internally helically grooved nut, generally designated 12, is received. The internal helically grooved channel or groove 13 of the nut complements the external helical groove or channel 14 of the screw and the helical grooves 13 and 14 cooperate to define a multiple turn, helical raceway in which a plurality of spherical ball bearing members 15 are received. The nut 12 includes a preferably steel cylindrical body portion 16 and a pair of low wear, synthetic plastic end caps 17 and 18 (i.e. nylon), each of which is provided with an integral end return configuration, generally designated 19, for separating balls from the ball train for return purposes, and for returning balls to the ball race, dependent on the direction in which the train of balls is moving. The configurations 19 are received in recesses 20 provided in the ends of nut 12.

Provided centrally in the body 16, is a recess or opening 21 which extends through the circumferential wall of the nut and into which an injection molded synthetic plastic insert, generally designated 22, may be dropped and secured in position, as by bolts 22a or the like extending through openings 22b in the nut wall. The purpose of insert 22 is to create two independent ball train circuits "a" and "b" in the nut 10, and, to facilitate this, the nut body is provided with two independent axial return passages 23 and 24. It is to be observed that the insert 22 includes a pair of channels 25 and 26 (FIG. 2) leading to the passages 23 and 24 respectively. In addition, a passage 27 is provided in the configuration 19 of the end cap member 17 which communicates with the passage 23, and a passage 28 is provided in the configuration 19 of the opposite end cap member 18 which communicates with passage 24. Since the end cap members 17 and 18 are of identical construction, except that their ball return channels 25 and 26 are 180° reversed in orientation when in assembled position, a description of one will suffice for the other.

Figures 3, 4:
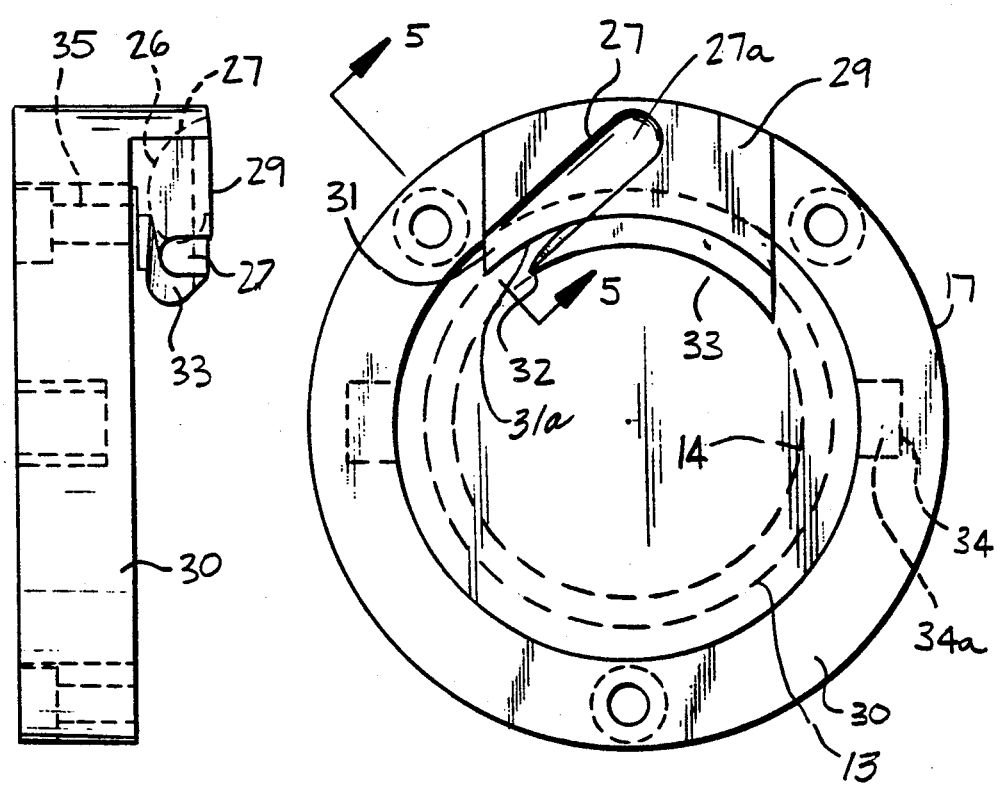
FIG. 3 is an end elevational view illustrating one of the nut end caps.
FIG. 4 is a side elevational view thereof.

Attention is now directed to FIGS. 3 and 4, wherein the communicating ball channel 27 is shown as provided in the ball return block 19 which projects in a generally axial direction from the end ring portion 30 of the end member 17. As FIG. 4 indicates, the radially inner portion of the back wall 27a of the channel 27 is cut away as at 31a to form a guide wall 31 which mates with and forms a helical continuation of the marginal wall of the groove 13 in the nut to guide balls into channel 27 on the same helical path they have been following or to return them in that path thereto. The opposite side wall in the channel projects, in the form of a ball deflector-guide finger or tongue 32, to enter the groove 14 in the lead screw, the tongue forming the leading end of an arcuate thread portion 33 of the configuration of groove 14 leading circumferentially from the edge 32 which is of helical thread configuration to seat in the groove 14 of the lead screw 11. Tongue 32 deflects the balls 15 in the helical path they have been following into the channel 27. Thread portion 33 is of sufficient circumferential extent that if, for some reason, the balls were to escape from the ball raceway formed between the ball nut and screw, the portion 33 would function as a load bearing surface and prevent a free fall separation of the nut and screw. Provided to secure the end caps 17 and 18, are threaded openings 35a in the ends of the body 16, and counterbored openings 35 provided in the end cap members 17 and 18 receive bolts 35b for securing the end caps in position. The entrances to passages 27 and 28 are initially aligned helically by the members 19 seating in recesses 20 to provide continuations of the helical path of travel of the balls 15.

Figure 7:
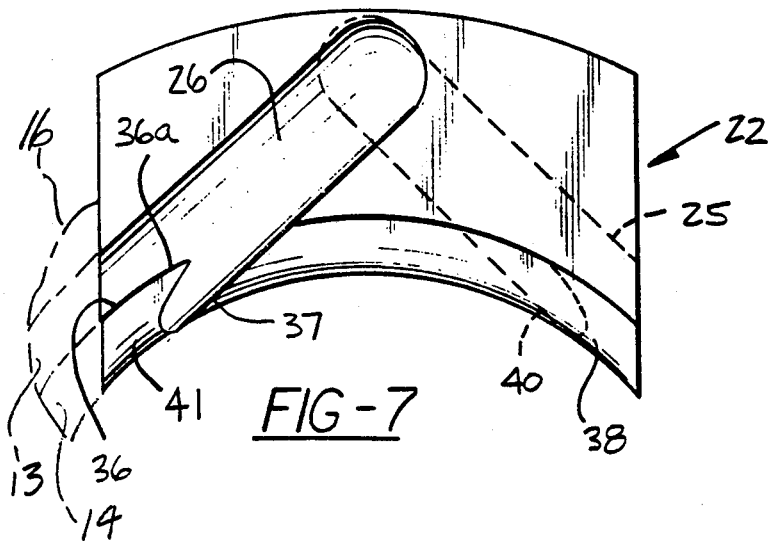
Figure 6:
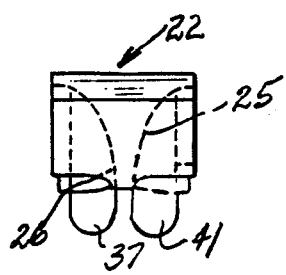
FIG. 6 is a side elevational view of a drop-in insert.
Figure 8:
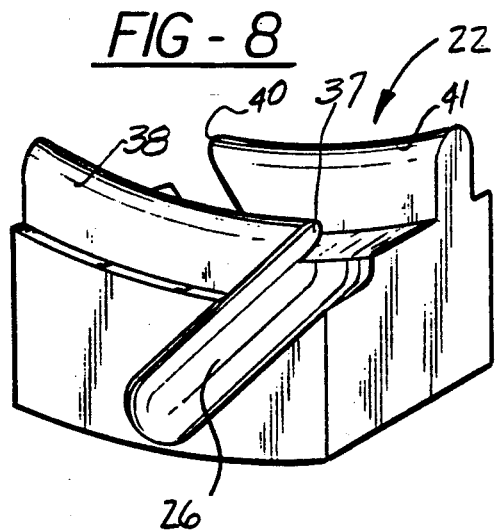
FIG. 8 is a perspective elevational view thereof, turned upside down.

As FIGS. 6–8 particularly illustrate, the one piece insert 22 is comprised of back to back, 180° reversed, integrated blocks 19. In these figures, the passage 26 is shown as having a back wall guide wall 36 which is cut away as at 36a to mate with and form a helical continuation of the marginal wall of the nut groove 13 to guide balls into the channel 26 on the same helical path they have been following. The opposite side wall of the channel 26 is shown as having a deflector tongue or finger 37 of lead screw thread cross-section which extends inwardly into the groove 13 of the screw 11. The circumferentially extending lead thread portion 38 leading away from tongue 37, which seats in the screw groove 13, is shown at 38.

The 180 degree opposite channel 25 has a back wall extending to mate with the marginal wall nut groove 13 to guide balls into the channel 25 on the same helical path they have been following or to return them in that path thereto. The passage 25 likewise has an opposite side wall with a finger or tongue 40 extending inwardly into the thread 14 of the screw 11, the tongue forming the leading end of a helical, thread-shaped portion 41 of the configuration of groove 14 leading circumferentially away therefrom. Helical deflector 40 like helical deflector 32 deflects the balls B into the channel 26 in the helical path the balls B have been following. The channels 25, 26, 27, and 28 are initially a tangentially extending helical continuation of the screw thread 14 and continue on the helical line, although in a linear path so that frictional resistance is minimized and the balls follow a more natural path as they move to and from the screw.

Figure 9:
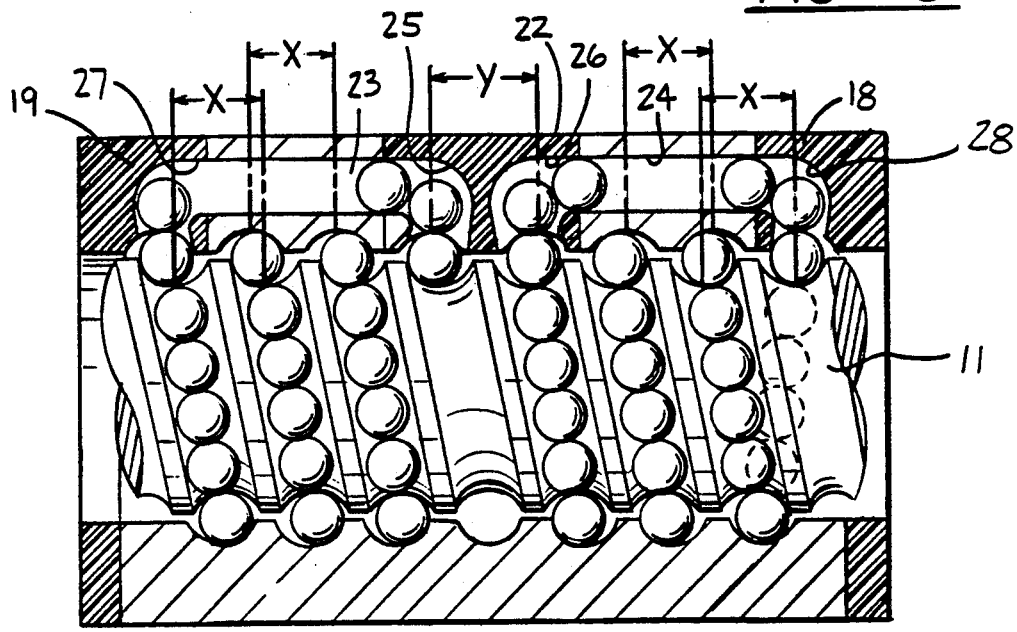
FIG. 9 is a schematic view showing an assembly wherein the balls are preloaded, and illustrating the method of preloading them.

As FIG. 9 indicates, the balls may be preloaded, and one of the advantages of the present construction is that the type of pre-loading to be described is possible. The axial spacing between the centers of the nut and screw grooves 13 and 14 respectively is a uniform distance "x" except that the 360 degree spaced portions of the nut groove 13 spanned by insert 22 is a greater distance "y", which provides a lead advance of, for example, 0.015 inches where the distance "x" is 0.250 inches and the distance "y" is 0.265 inches. This occurs when the center distance between the screw groove turns remains a constant "x". The result is to preload the balls in both of the circuits a and b defined by separate ball return ports 23 and 24 and the respective portions of insert 22 and end caps 18 and 19 which cooperate with them.

THE OPERATION

Figure 2:
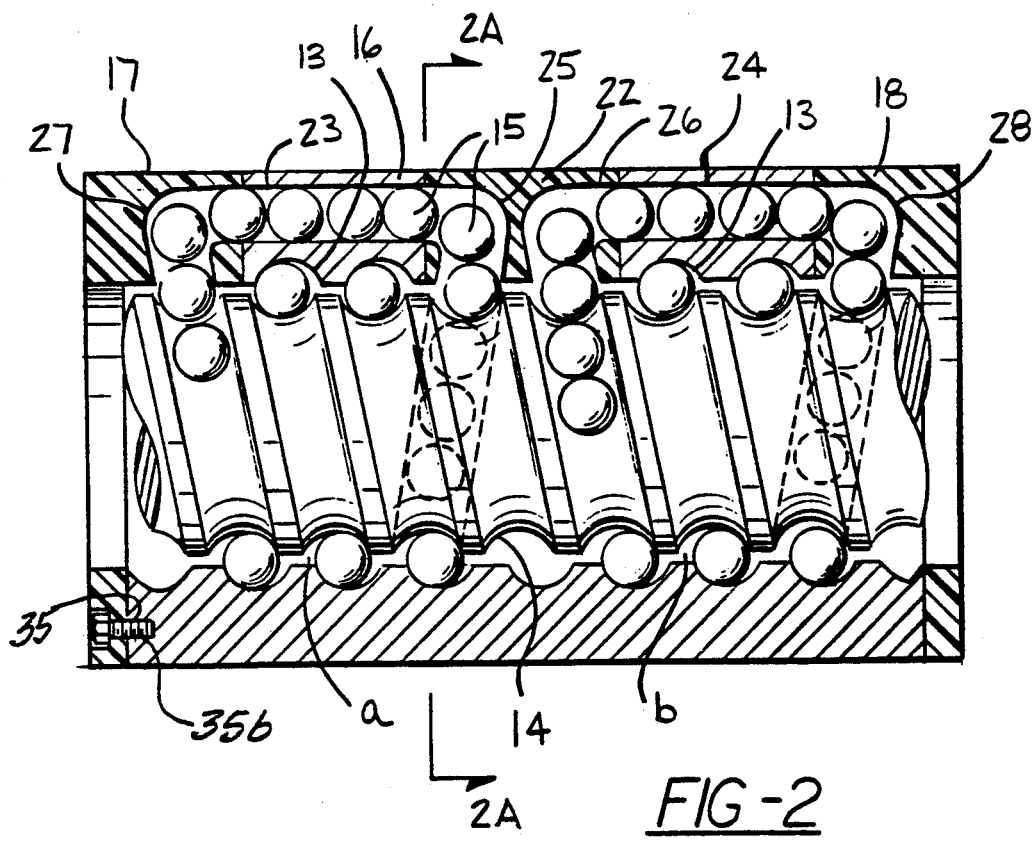
FIG. 2 is a schematic cross-sectional view.
Figure 2A:
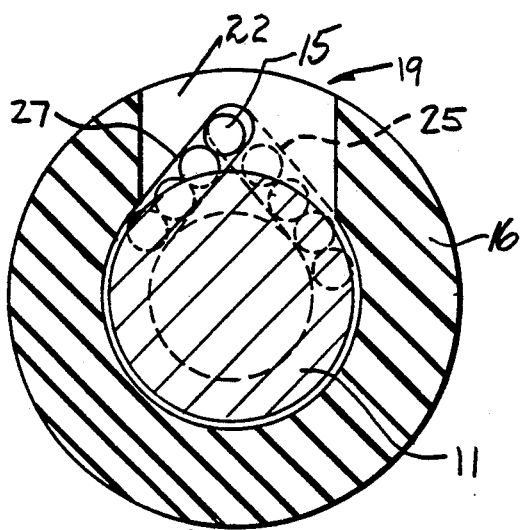
FIG. 2A is a cross-sectional view taken on the line 2A—2A of FIG. 2.
Figure 5:
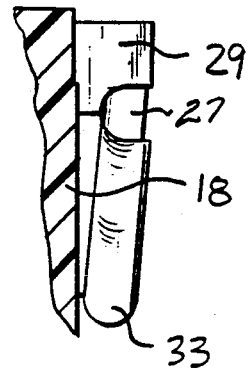
FIG. 5 is a fragmentary sectional view taken on the line 5—5 of FIG. 3.

Considering now particularly FIG. 2, if the screw 11 is revolving, but is prevented from moving axially, and assuming that this causes the nut 10 to move from left to right in FIG. 1, it is the deflector portion 37 of insert 22 which removes balls to the channel 25 and return passage 23. In passage 23, the balls are moved down channel 27 to the ball raceway circuit "a" once again. Left to right movement of nut 10, at the same time, causes the end cap deflector 32 of cap member 18 to direct balls into the passage 28 and on to the passage 24, whence the balls travel back to the second ball circuit "b" via the channel 26. Reverse relative movement of the nut 10 causes the deflector 40 to move the balls to channel 26 and on to return passage 24 whence they are guided back to the raceway provided by grooves 13 and 14 by the passage 28 in the end cap 18. At the same time end cap 17 deflector 32 removes balls B from the raceway into the channel 27 in end cap 17 and on to the return passage 23. The balls move back to the raceway via channel 25 in the insert 22.

It is to be understood that the embodiments described are exemplary of various forms of the invention only and that the invention is defined in the appended claims which contemplate various modifications within the spirit and scope of the invention.

What I claim is:

1. In a ball nut screw assembly:
   a. a helically externally grooved screw providing a screw ball race;
   b. a generally tubular nut with an exterior circumferential wall bounded by generally transversely extending ends received on said screw and having a complemental internal helical groove with outer ends providing a nut ball race corresponding to said screw ball race and extending substantially from one end of the nut to the other end of the nut, there being a plurality of balls received by and operative in said races to radially separate said nut and screw;
   c. said nut having a first internal axial ball return passage within said wall leading endwisely outwardly in one direction from a location interjacent the ends of the nut ball race and a second internal axial ball return passage within said wall axially spaced from said first ball return passage and leading endwisely outwardly in the opposite direction from said location;
   d. ball return members at the outer ends of the ball return passages configured for moving balls to and from said ball races from and to said first and second ball return passages;
   e. said nut having a radially extending slot of limited circumferential extent at said location axially between said first and second ball return passages leading from the exterior circumferential surface of said nut through said nut to said nut ball race, said slot having generally axially extending marginal walls joined by generally transversely extending marginal walls;
   f. radial drop-in insert means of limited circumferential extent with generally axially extending walls received by said generally axially extending walls of said slot and with generally transversely extending marginal walls received by said generally transversely extending marginal walls of said slot, said insert means having a pair of adjacent end return elements, each element having a generally circumferentially extending tongue extending inwardly into the screw ball race and an adjacent generally radially directed channel leading to one of said ball return passages, said tongues extending radially in opposite directions to deflect the balls from said screw ball race into the adjacent channels and to said first and second ball return passages dependant on the direction of travel of the balls to provide independent circuits of recirculating balls in said ball race.

2. The assembly of claim 1 wherein said tongues and channels angle helically in helical alignment with the helical nut groove.

3. The assembly of claim 2 wherein said channels are linear before curving to mate with said ball return passages.

4. The assembly of claim 1 wherein said insert means is a releasably secured, one piece block having a circumferential surface mating with the exterior circumferential surface of said nut.

5. The assembly of claim 1 wherein said return members are caps at each end of the nut which each include an arcuately extending tongue extending inwardly into the screw ball race and an adjacent generally radially angularly directed channel leading to one of said ball return passages, each tongue extending to deflect balls from said screw ball race into the adjacent channel.

6. The assembly of claim 1 wherein each said tongue provides a radially inner wall portion of the adjacent channel.

7. The assembly of claim 6 wherein the channel has a bottom wall which is cut away to form a wall which extends into the nut groove to mate therewith and form a helical continuation of the nut groove which leads the balls into the channel on the same helical path the balls have been following.

8. The assembly of claim 7 wherein the path of ball return rotation to said ball return passages is in the neighborhood of 35°.

9. The assembly of claim 1 wherein each said tongue is the leading edge of a helical thread segments received in said screw ball race.

10. The assembly of claim 1 wherein said balls form ball trains which are preloaded by the configuration of said ball races.

11. The assembly of claim 1 wherein said insert means is in the configuration of a parallelogram.

* * * * *

UNITED STATES PATENT AND TRADEMARK OFFICE
CERTIFICATE OF CORRECTION

PATENT NO. : 5,193,409
DATED : March 16, 1993
INVENTOR(S) : James A. Babinski

It is certified that error appears in the above-identified patent and that said Letters Patent is hereby corrected as shown below:

Column 3, line 4, change "6" to -- 7 --.

Signed and Sealed this

Fifteenth Day of March, 1994

Attest:

BRUCE LEHMAN

Attesting Officer    Commissioner of Patents and Trademarks